W. W. PITTMAN.
HARROW:
APPLICATION FILED OCT. 25, 1910.

1,003,498.

Patented Sept. 19, 1911.

Witnesses

Inventor

By

Attorney

COLUMBIA PLANOGRAPH CO., WASHINGTON, D. C.

UNITED STATES PATENT OFFICE.

WILLIAM WASHINGTON PITTMAN, OF ELLISVILLE, MISSISSIPPI.

HARROW.

1,003,498.  Specification of Letters Patent.  Patented Sept. 19, 1911.

Application filed October 25, 1910. Serial No. 589,077.

*To all whom it may concern:*

Be it known that I, WILLIAM W. PITTMAN, a citizen of the United States, residing at Ellisville, in the county of Jones and State of Mississippi, have invented certain new and useful Improvements in Harrows, of which the following is a specification.

My invention relates to improvements in harrows, and has particular reference to a manually guided harrow of simple construction.

The object of my invention is the provision in connection with a walking harrow, of an improved wheel secured to the beam thereof which will be adapted either to serve as a fulcrum when pressure is applied to the handles of the harrow to force the teeth thereof into the soil, or to serve as a supporting wheel, the harrow being swung upward and moving along as a wheel barrow with the teeth out of engagement with the surface over which the machine is passing.

A further object of the invention is the provision of simple, inexpensive and durable brackets for securing the wheel to the harrow which can be quickly removed or swung with the wheel out of the way when desired.

To attain the desired objects, my invention comprises a harrow of the ordinary drag type having my improved brackets secured to the beam thereof and my wheel rotatably held by the brackets, the invention further residing in the novel features of construction and combination and arrangement of parts for service substantially as described and as illustrated in the accompanying drawings.

Figure 1:
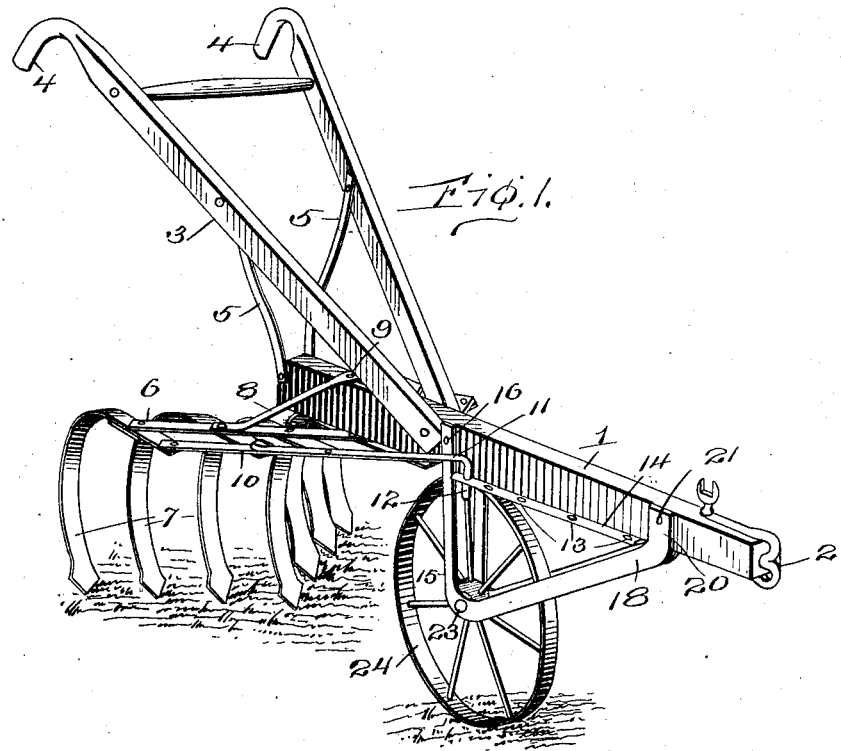
Figure 2:
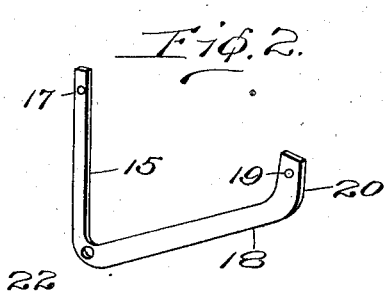

Figure 1 represents a perspective view of a harrow having my wheel applied thereto, and, Fig. 2 represents a perspective view of one of the brackets or hangers.

In the drawings, the numeral 1 designates the beam of the harrow having secured at one end the clevis 2 and having attached at the other and extending upward therefrom the handles 3 having a gripping portion 4 and braced by the members 5 extending upward from the rear end of the beam.

Pivotally secured to the beam below the handles is a plate 6 bearing the harrow teeth 7, a brace 8 being pivotally secured to the upper face of the beam by the upper end of the pivot bolt 9 of the plate 6 and having its free end secured to said plate for aiding in retaining the same in position and supporting the same. A second plate 10 is secured to the front or upper ends of the teeth 7, and extending forward from the latter plate is a rod 11 having a hooked end 12 adapted to be engaged in one of the openings 13 in the plate 14 carried by the beam, the adjustment of the rod regulating the position of the harrow teeth with respect to the beam and consequently to the line of draft of the harrow.

Secured to the beam adjacent the base of the handles 3 on each side is the vertical arm 15 of my improved bracket, a bolt 16 passing through the beam and the openings 17 in the bracket for securing the two halves thereof in engagement with the sides of the beam, said arms having a forward upwardly inclined arm or extension 18 terminating in a portion 20 parallel to the arms 15, there being openings 19 in the portion 20, and a second bolt 21 passes through the beam and said openings and secures the free ends of the brackets to the front portion of the beam, as will be readily understood by reference to the drawings. The brackets are further provided at the base of the vertical arms 15 with openings 22 providing bearings for the ends of the axle 23 which bears the supporting wheel 24.

From the foregoing description taken in connection with Fig. 1 the construction of my improved harrow will be readily understood and its advantages be fully appreciated, and it will be seen that I have provided a simple and efficient harrow having a supporting wheel secured to the beam thereof, in which construction the bracket securing said wheel has a vertical arm to cause the weight of the harrow to bear directly down upon the axle of the wheel, and an inclined forward arm to brace the vertical arm and withstand the rearward drag thereon as the harrow is used. It will be further observed that the arms 18 extend near to the end of the beam, and if desired, the rear bolt 16 may be removed and the brackets with the wheel therebetween swung around the end of the beam until the wheel is on the top thereof, there being sufficient clearance between the rim of the wheel and the end of the beam, the harrow then becoming a simple drag harrow but bearing the wheel which can be quickly placed in operative position.

I claim:

A support for a harrow beam consisting of a pair of brackets secured to the beam and each having a vertical and an inclined long arm, united by a bend, the upper end of the vertical arm being secured to the beam, the bend at the end of said arms forming the axle bearing, the inclined long arm formed with a short vertical portion for connection with the beam and the ground wheel having its axle journaled in the bearing formed at the bend of the brackets.

In testimony whereof I affix my signature, in presence of two witnesses.

WILLIAM WASHINGTON PITTMAN.

Witnesses:
M. F. BLACKWELL,
DANIEL PITTS.